US012054116B2

United States Patent
Min

(10) Patent No.: US 12,054,116 B2
(45) Date of Patent: Aug. 6, 2024

(54) EXTERNAL AIRBAG DEVICE

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/347,607

(22) Filed: Jul. 6, 2023

(65) Prior Publication Data
US 2024/0010160 A1    Jan. 11, 2024

(30) Foreign Application Priority Data
Jul. 7, 2022   (KR) .......................... 10-2022-0083844

(51) Int. Cl.
*B60R 21/36*  (2011.01)
*B60R 21/34*  (2011.01)

(52) U.S. Cl.
CPC ........ *B60R 21/36* (2013.01); *B60R 2021/346* (2013.01)

(58) Field of Classification Search
CPC ............................. B60R 21/213; B60R 21/36
See application file for complete search history.

(56) References Cited

U.S. PATENT DOCUMENTS

| | | | |
|---|---|---|---|
| 7,757,804 B1 * | 7/2010 | Li ........................... | B60R 21/34 180/274 |
| 11,021,126 B1 * | 6/2021 | Zoellner ................ | B60R 21/232 |
| 2019/0366972 A1 * | 12/2019 | Nakamura .............. | B60R 21/36 |
| 2019/0375367 A1 * | 12/2019 | Aoki ........................ | B60R 21/36 |
| 2020/0180550 A1 * | 6/2020 | Kwon ..................... | B60R 21/213 |
| 2020/0207301 A1 * | 7/2020 | Lombrozo .............. | B60R 21/34 |
| 2021/0179004 A1 * | 6/2021 | Lee ........................ | B60R 21/214 |
| 2021/0229623 A1 * | 7/2021 | Kwon ..................... | B60R 21/213 |
| 2021/0245692 A1 * | 8/2021 | Lee ........................ | B60R 21/013 |
| 2022/0063551 A1 | 3/2022 | Haltom | |
| 2022/0306039 A1 * | 9/2022 | Lee ........................ | B60R 21/36 |
| 2022/0371541 A1 * | 11/2022 | Lee ........................ | B60R 21/36 |

FOREIGN PATENT DOCUMENTS

| | | | | |
|---|---|---|---|---|
| DE | 102022106974 A1 * | 9/2022 | ............ | B60R 21/36 |
| DE | 102021123602 A1 * | 11/2022 | ............ | B60R 21/36 |
| EP | 1580087 A2 * | 9/2005 | ............ | B60R 21/34 |
| EP | 2796327 A2 * | 10/2014 | .......... | B60R 21/237 |
| EP | 3309017 A1 * | 4/2018 | ............ | B60R 21/34 |
| JP | 2000264146 A * | 9/2000 | .......... | B60R 21/013 |
| KR | 20220068733 A * | 5/2022 | | |
| KR | 20220098974 A * | 7/2022 | | |

* cited by examiner

*Primary Examiner* — Nicole T Verley
(74) *Attorney, Agent, or Firm* — NovoTechIP International PLLC

(57) ABSTRACT

The present invention relates to an external airbag device optimized in design to reduce collision energy to be applied to a vehicle and safely protect a pedestrian, and the external airbag device includes deployment guides provided in an up/down longitudinal direction of a vehicle, and an airbag cushion configured to be deployed along the deployment guide and cover an outer surface of the vehicle.

9 Claims, 4 Drawing Sheets

EXTERNAL AIRBAG DEVICE

CROSS-REFERENCE TO RELATED APPLICATIONS

The present application claims priority to Korean Patent Application No. 10-2022-0083844, filed on Jul. 7, 2022, the entire contents of which are incorporated herein for all purposes by this reference.

TECHNICAL FIELD

The present invention relates to an external airbag device optimized in design to reduce collision energy to be applied to a vehicle and safely protect a pedestrian.

BACKGROUND

An external airbag predicts in advance a collision situation while a vehicle travels. Alternatively, the external airbag absorbs collision energy by deploying an airbag cushion in a collision situation.

Therefore, the external airbag reduces a risk of injury by reducing the amount of impact to be applied to a passenger in the vehicle and a pedestrian.

Meanwhile, the external airbag needs to properly perform a shock absorbing function to reduce collision energy to be applied to the vehicle and safely protect a pedestrian in the event of a collision accident of the vehicle.

To this end, there is a need to optimize a shape, a size, a deployment position, and the like of an airbag cushion by developing a technology of an external airbag device.

The foregoing explained as the background is intended merely to aid in the understanding of the background of the present invention, and is not intended to mean that the present invention falls within the purview of the related art that is already known to those skilled in the art.

SUMMARY

The present invention is proposed to solve these problems and aims to provide an external airbag device optimized in design to reduce collision energy to be applied to a vehicle and protect a pedestrian.

To achieve the above-mentioned object, the present invention provides an external airbag device including: deployment guides provided in an up/down longitudinal direction of a vehicle; and an airbag cushion configured to be deployed along the deployment guide and cover an outer surface of the vehicle.

The airbag cushion may be deployed downward from a roof part of the vehicle.

An airbag housing may be provided on a roof part of the vehicle, the airbag cushion may be folded in the airbag housing, and the airbag cushion may be deployed downward.

An airbag cover may be coupled to the airbag housing, and the airbag cushion may be deployed as the airbag cover is opened.

The deployment guides may be respectively provided on left and right pillar parts of the vehicle, and the airbag cushion may be deployed between the left and right pillar parts.

Guide housings may be respectively provided on left and right pillar parts of the vehicle, the deployment guides each having a wire shape may be accommodated in the guide housings, a plurality of guide rings may be provided at left and right sides of the airbag cushion in a longitudinal direction in which the airbag cushion is deployed, and the airbag cushion may be deployed along the deployment guides as the guide rings move along the deployment guides in a state in which the guide rings are inserted into the deployment guides.

The deployment guide may be configured to move to the outside of the guide housing when the airbag cushion is deployed.

A length of the airbag cushion in a left/right width direction may be equal to or shorter than a length between the left and right pillar parts.

A guide cover may be coupled to the guide housing, and the deployment guide may move to the outside of the guide housing as the guide cover is opened.

An airbag housing, in which the airbag cushion is accommodated, may be provided on an outer surface of a roof part of the vehicle in a left/right longitudinal direction, and guide housings, in which the deployment guides are accommodated, may be provided on outer surfaces of pillar parts of the vehicle in an up/down longitudinal direction and connected to two opposite ends of the airbag housing.

The airbag cushion may be deployed from any one of or both front and rear surfaces of the vehicle.

The present invention provides an external airbag device including: an airbag housing provided on an outer surface of a vehicle in a longitudinal direction; guide housings configured to accommodate deployment guides, provided on the outer surface of the vehicle in a longitudinal direction orthogonal to the airbag housing, and connected to two opposite ends of the airbag housing; and an airbag cushion accommodated in the airbag housing and configured to be deployed in a shape that covers the outer surface of the vehicle as two opposite sides of the airbag cushion is guided by the deployment guides.

According to the present invention with the above-mentioned technical solutions, the airbag cushion absorbs impact energy caused by a collision of the vehicle and reduces an impact force, thereby preventing an injury to a passenger.

In addition, in case that the vehicle collides with a pedestrian, the pedestrian collides with the airbag cushion disposed outside the vehicle, such that the impact energy applied to the pedestrian is absorbed, and an injury to the pedestrian is minimized.

DETAILED DESCRIPTION

Figure 1:
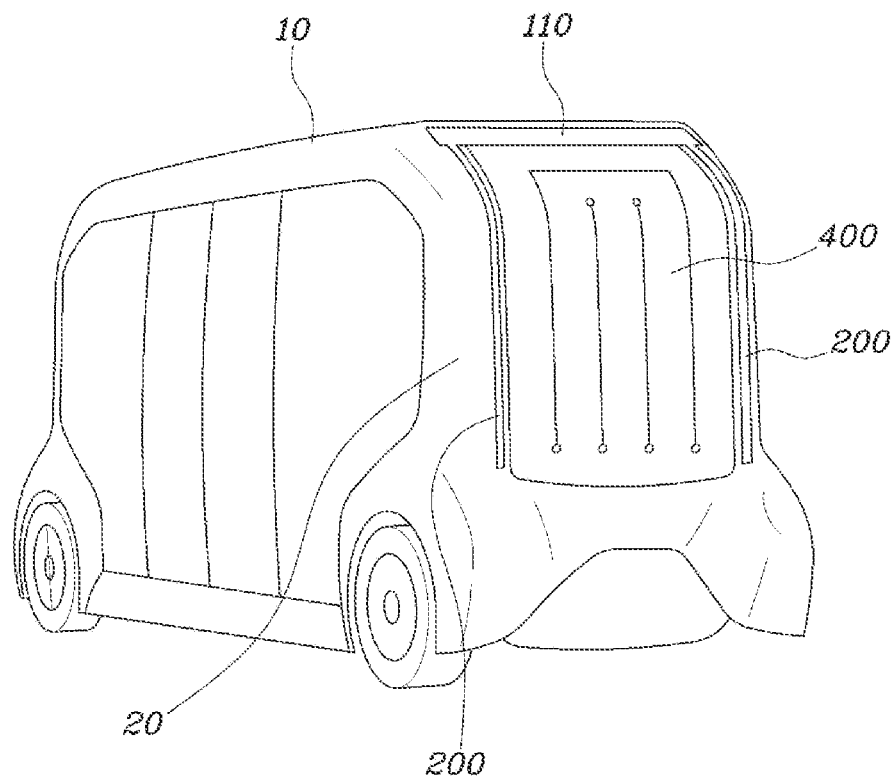
FIG. 1 is a view illustrating a deployed shape of an external airbag in a vehicle according to the present invention.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

In addition, a controller may include a communication device configured to communicate with another control unit or a sensor to control a corresponding function, a memory configured to store an operating system, a logic instruction, and input/output information, and one or more processors configured to perform determination, computation, decision, or the like required to control the corresponding function.

Figure 2:
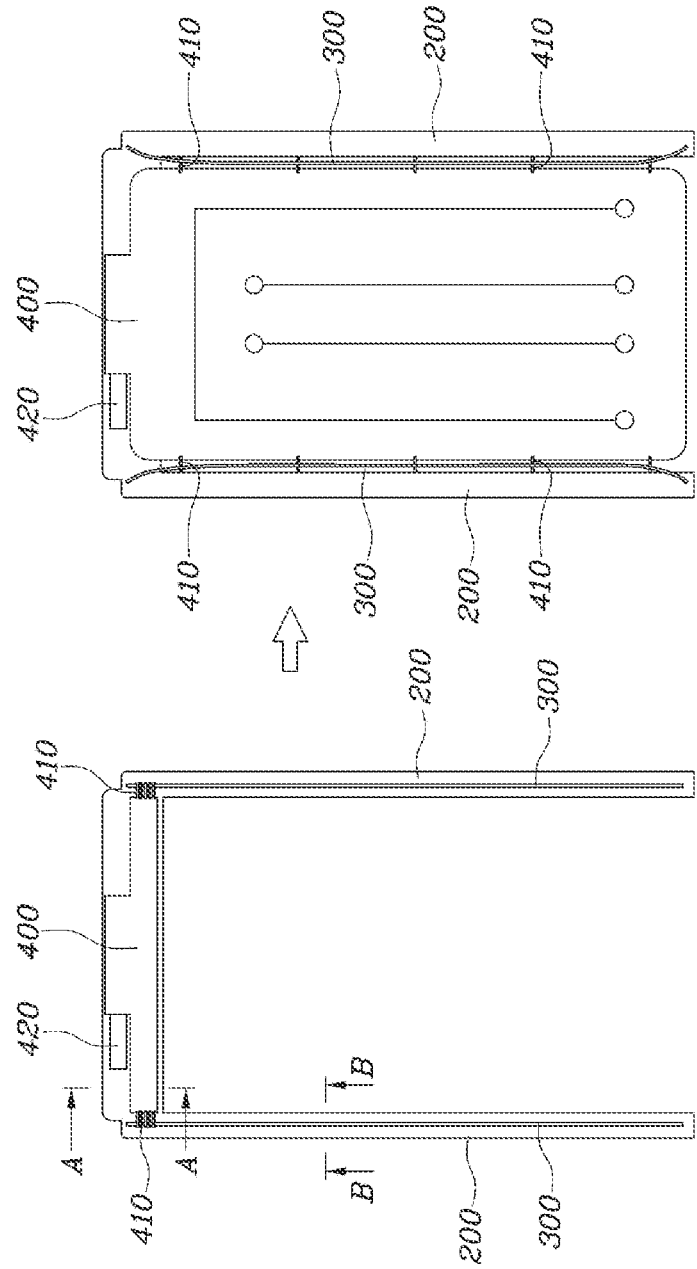
FIG. 2 is a view illustrating states made before and after the airbag cushion according to the present invention is deployed.

FIG. 1 is a view illustrating a deployed shape of an external airbag in a vehicle according to the present invention, and FIG. 2 is a view illustrating states made before and after the airbag cushion 400 according to the present invention is deployed.

With reference to the drawings, an external airbag device of the present invention includes deployment guides 300 provided (or disposed) in a vertical direction (i.e., up/down longitudinal direction) of a vehicle, and the airbag cushion 400 configured to be deployed along the deployment guides 300 and cover an outer surface of the vehicle.

For example, the vehicle of the present invention is a PBV vehicle that may travel in a manned or unmanned manner. Window glass parts may be installed on front and rear surfaces of the vehicle.

Therefore, the airbag cushion 400 of the external airbag may be deployed in a shape that covers the window glass parts installed on the front and rear surfaces of the vehicle.

That is, when various types of sensors installed in the vehicle detect a collision accident of the vehicle or predict a collision accident, an airbag control unit transmits a signal to an external airbag module, such that the external airbag is deployed.

Therefore, the airbag cushion 400 of the external airbag covers the outer surface of the vehicle while being deployed in the longitudinal direction of the deployment guide 300.

Therefore, the airbag cushion 400 absorbs impact energy caused by a collision of the vehicle and reduces an impact force, thereby preventing an injury to a passenger.

In addition, in case that the vehicle collides with a pedestrian, the pedestrian collides with the airbag cushion 400, such that the impact energy applied to the pedestrian is absorbed, and an injury to the pedestrian is minimized.

Further, as illustrated in FIG. 1, the airbag cushion 400 of the present invention may be deployed downward from a roof part or roof 10 of the vehicle.

That is, the airbag cushion 400 begins to be deployed from an upper end of the roof part of the vehicle and deployed downward to cover the outer surfaces of the front and rear sides of the vehicle.

To this end, in the present invention, an airbag housing 100 is provided on the roof part of the vehicle, the airbag cushion 400 is folded in the airbag housing 100, and the airbag cushion 400 is configured to be deployed downward.

Further, an airbag cover 110 may be coupled to the airbag housing 100, and the airbag cover 110 may be opened, such that the airbag cushion 400 may be deployed.

Figure 3:
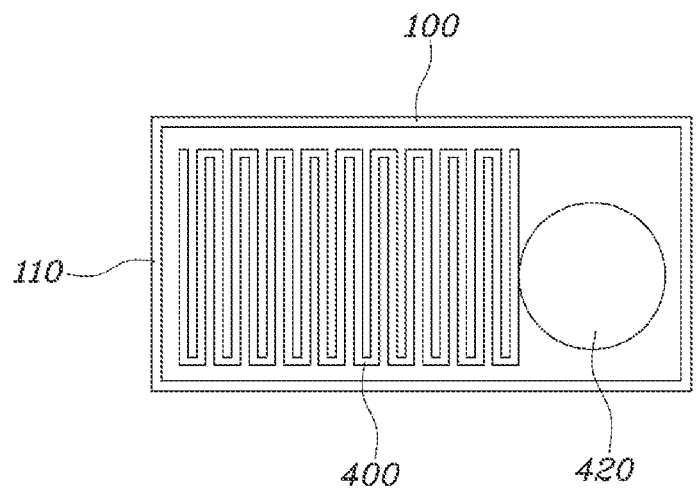
FIG. 3 is a cross-sectional view taken along line A-A in FIG. 2.
Figure 4:
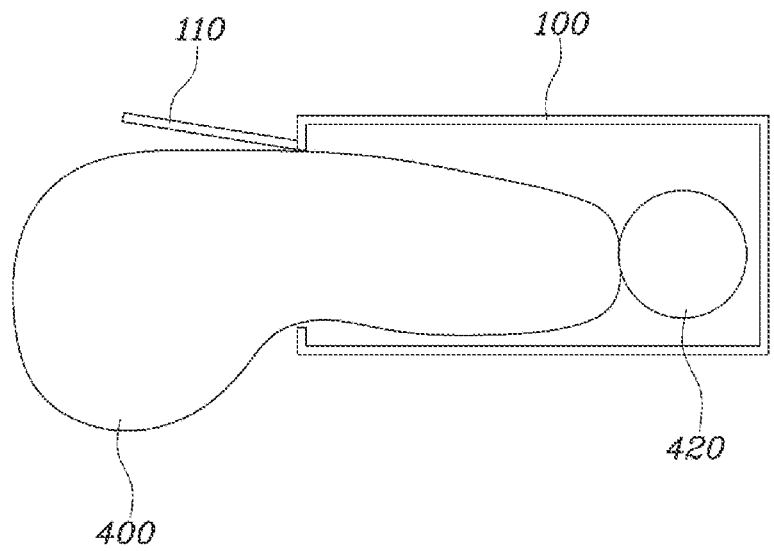
FIG. 4 is a view illustrating a state in which the airbag cushion in FIG. 3 is deployed.

FIG. 3 is a cross-sectional view taken along line A-A in FIG. 2, and FIG. 4 is a view illustrating a state in which the airbag cushion 400 in FIG. 3 is deployed.

With reference to the drawings, the airbag cushion 400 and an inflator 420 are provided in the airbag housing 100.

The airbag cushion 400 is folded in a zigzag shape in the airbag housing 100. The inflator 420 is connected to a gas injection port of the airbag cushion 400 and generates gas in accordance with an ignition operation of an ignition device, such that the inflator 420 supplies the gas into the airbag cushion 400.

Further, the airbag cover 110 is coupled, by means of a hinge structure, to an end of the airbag housing 100 from which the airbag cushion 400 exits. Therefore, when the airbag operates, the airbag cover 110 is opened about the hinge structure, such that the airbag cushion 400 is deployed to the outside of the airbag housing 100.

Meanwhile, FIG. 2 is a view illustrating states made before and after the deployment guides 300 accommodated in guide housings 200 operate.

With reference to the drawings, in the present invention, the deployment guides 300 may be respectively provided on left and right pillar parts or pillars 20 of the vehicle, such that the airbag cushion 400 may be deployed between the left and right pillar parts 20.

In this case, the pillar parts 20 serve as pillars positioned at left and right sides of the front side of the vehicle in case that the airbag cushion 400 is deployed at the front side of the vehicle. The pillar parts 20 serve as pillars positioned at left and right sides of the rear side of the vehicle in case that the airbag cushion 400 is deployed at the rear side of the vehicle.

That is, the airbag cushion 400 is deployed downward from the upper end of the roof part along the deployment guides 300 provided on the left and right pillar parts 20.

The configuration in which the airbag cushion 400 is deployed downward along the deployment guides 300 will be more specifically described with reference to FIGS. 1 and 2. The guide housings 200 are respectively provided on the left and right pillar parts 20 of the vehicle, and the deployment guides 300 each having a wire shape are respectively accommodated in the guide housings 200. A plurality of guide rings 410 is provided at left and right sides of the airbag cushion 400 and disposed in the longitudinal direction in which the airbag cushion 400 is deployed. The airbag cushion 400 is deployed along the deployment guides 300 as the guide rings 410 move along the deployment guides 300 in a state in which the guide rings 410 are inserted into the deployment guides 300.

For example, upper and lower ends of the deployment guide 300 are respectively fixed to upper and lower ends in the guide housing 200.

Further, the guide rings 410 are disposed at predetermined intervals in the longitudinal direction and fastened to two opposite sides of the airbag cushion 400 based on a state in which the airbag cushion 400 is deployed. The guide rings 410 are inserted into the deployment guide 300 having a wire shape and move upward or downward along the deployment guide 300.

That is, during a process of deploying the airbag cushion 400, the guide rings 410 move along the deployment guide 300 in a deployment direction of the airbag cushion 400, such that the airbag cushion 400 is deployed downward from the roof part 10. Therefore, the airbag cushion 400 covers the front or rear surface of the vehicle and reduces collision energy caused by a collision accident.

Figure 5:
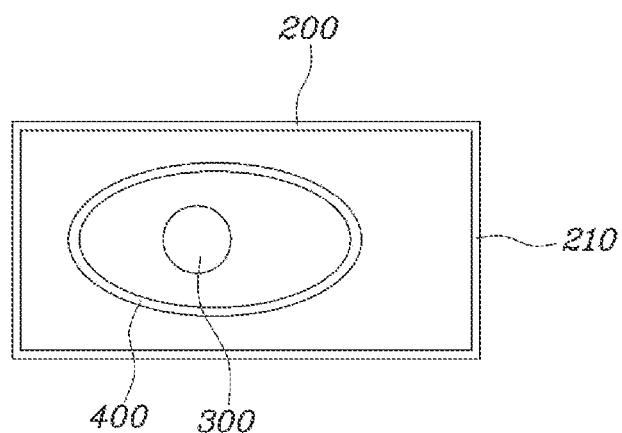
FIG. 5 is a cross-sectional view taken along line B-B in FIG. 2.
Figure 6:
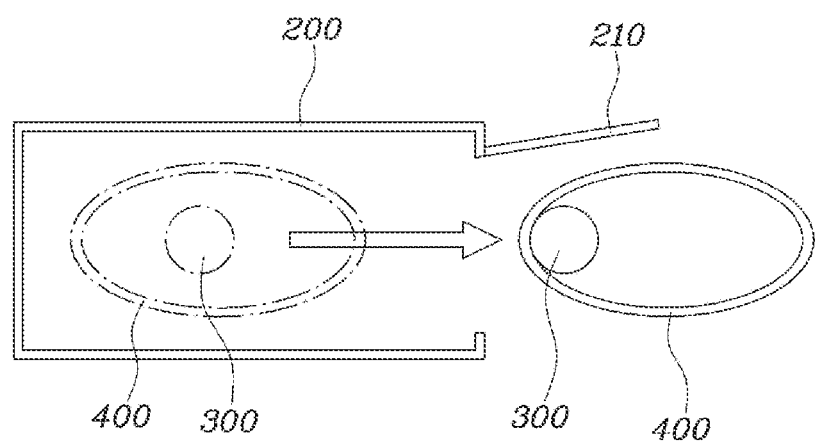
FIG. 6 is a view illustrating a state in which a deployment guide in FIG. 5 is moved.

Further, FIG. 5 is a cross-sectional view taken along line B-B in FIG. 2, and FIG. 6 is a view illustrating a state in which the deployment guide 300 in FIG. 5 is moved.

With reference to the drawings, the deployment guide 300 is configured to move the outside of the guide housing 200 when the airbag cushion 400 is deployed.

That is, the deployment guide 300 is in a state of being accommodated in the guide housing 200 before the airbag operates to smoothly deploy the airbag cushion 400. During the process of deploying the airbag cushion 400, the deployment guide 300 moves out of the guide housing 200.

In the present invention, to move the deployment guide 300 to the outside of the guide housing 200, a length of the airbag cushion 400 in a left/right width direction is equal to or smaller than a length between the left and right pillar parts 20.

That is, during the process of deploying the airbag cushion 400, the left and right sides of the airbag cushion 400 move toward a center of the airbag cushion 400 as the airbag cushion 400 is inflated, such that a length of the inflated airbag cushion 400 in the left/right width direction becomes less than a length of the airbag cushion 400 in the left/right width direction before the airbag cushion 400 is inflated.

Therefore, as the guide rings 410 fastened to the airbag cushion 400 pull the deployment guide 300 toward the airbag cushion 400, such that the deployment guide 300 moves to the outside of the guide housing 200, and the airbag cushion 400 is smoothly deployed.

Further, in the present invention, a guide cover 210 is coupled to the guide housing 200 by means of a hinge structure, such that the guide cover 210 may be opened, and the deployment guide 300 may move to the outside of the guide housing 200.

That is, the guide cover 210 is coupled, by means of the hinge structure, to an end of the guide housing 200 from which the deployment guide 300 exits. Therefore, when the airbag operates, the guide cover 210 is opened about the hinge structure, such that the deployment guide 300 moves to the outside of the guide housing 200.

Meanwhile, as illustrated in FIG. 2, the present invention provides a structure in which the airbag housing 100, in which the airbag cushion 400 is accommodated, is provided on an outer surface of the roof part 10 of the vehicle in the left/right longitudinal direction, and the guide housings 200, in which the deployment guides 300 are accommodated, are provided on outer surfaces of the pillar parts 20 of the vehicle in the up/down longitudinal direction and connected to the two opposite ends of the airbag housing 100.

For example, the airbag housing 100 and the guide housings 200 are each installed on an outer panel of the vehicle and provided in the form of a garnish or a separate structure.

Further, the upper ends of the guide housing 200 are connected to the two opposite ends of the airbag housing 100, such that the airbag housing 100 and the guide housings 200 are provided in a 'U' shape on the outer surface of the vehicle, and the airbag cushion 400 is deployed in a space between the airbag housing 100 and the guide housing 200.

Meanwhile, the external airbag device of the present invention may be installed on not only the front or rear surface of the vehicle but also on a lateral surface of the vehicle. In addition, the airbag cushion 400 may be configured to be deployed in a leftward/rightward direction as well as an upward/downward direction.

To this end, the external airbag device of the present invention includes the airbag housing 100 provided on the outer surface of the vehicle in the longitudinal direction, the guide housings 200 configured to accommodate the deployment guides 300, provided on the outer surface of the vehicle in the longitudinal direction perpendicular or orthogonal to the airbag housing 100, and connected to the two opposite ends of the airbag housing 100, and the airbag cushion 400 accommodated in the airbag housing 100 and configured to be deployed in a shape that covers the outer surface of the vehicle as the two opposite sides of the airbag cushion 400 are guided by the deployment guides 300.

Hereinafter, an operation of deploying the external airbag according to the present invention will be described.

When an operational signal for the external airbag is applied as a collision accident of the vehicle occurs or a collision accident is predicted, the gas, which is generated by the inflator 420 as the inflator 420 operates, is supplied to the airbag cushion 400.

Therefore, the airbag cushion 400 is inflated, such that the airbag cover 110 is opened, and the airbag housing 100 is deployed outward.

Next, a deployment force of the inflated airbag cushion 400 allows the guide rings 410 to pull the deployment guides 300, such that the deployment guides 300 move to the outside of the guide housings 200.

Further, the guide rings 410 guide the deployment direction of the airbag cushion 400 while moving downward along the deployment guides 300, such that the airbag cushion 400 is deployed downward in a shape that covers the outer surfaces of the front and rear sides of the vehicle.

Therefore, the airbag cushion 400 of the present invention absorbs impact energy caused by a collision of the vehicle and reduces an impact force, thereby preventing an injury to a passenger.

In addition, in case that the vehicle collides with a pedestrian, the pedestrian collides with the airbag cushion 400 disposed outside the vehicle, such that the impact energy applied to the pedestrian is absorbed, and an injury to the pedestrian is minimized.

While the present invention has been described with reference to the specific examples, it is apparent to those skilled in the art that various modifications and alterations may be made within the technical spirit of the present invention, and these modifications and alterations belong to the appended claims.

What is claimed is:

1. An external airbag device comprising:
   first and second guide housings respectively disposed at first and second pillars of a vehicle and respectively extending along the first and second pillars;
   first and second deployment guides respectively housed at the first and second guide housings;
   an airbag cushion configured to deploy along the first and second deployment guides and cover an outer surface of the vehicle between the first and second pillars; and
   a plurality of guide rings including (1) a plurality of first guide rings coupled to a first side of the airbag cushion and (2) a plurality of second guide rings coupled to a second side of the airbag cushion opposite to the first side,
   wherein the first deployment guide extends through the plurality of first guide rings, and the second deployment guide extends through the plurality of second guide rings, and
   wherein the first and second deployment guides are configured to respectively move out from the first and second guide housings when the airbag cushion is deployed.

2. The external airbag device of claim 1, wherein the airbag cushion is configured to deploy downwardly from a roof of the vehicle.

3. The external airbag device of claim 1, further comprising an airbag housing disposed at a roof of the vehicle, wherein the airbag cushion is stored folded in the airbag housing and configured to deploy downwardly from the airbag housing.

4. The external airbag device of claim 3, further comprising an airbag cover coupled to the airbag housing and configured to be opened when the airbag cushion is deployed.

5. The external airbag device of claim 1, wherein a width of the airbag cushion is equal to or smaller than a gap between the first and second pillars of the vehicle.

6. The external airbag device of claim 1, wherein each of the first and second guide housings includes a guide cover configured to be opened when the first and second deployment guides respectively move out from the first and second guide housings.

7. The external airbag device of claim 1, further comprising: an airbag housing disposed at an outer surface of a roof of the vehicle and configured to house the airbag cushion, wherein the first and second guide housings are respectively coupled to two opposite ends of the airbag housing.

8. The external airbag device of claim 1, wherein the airbag cushion is configured to deploy from at least one of front and rear portions of the vehicle.

9. An external airbag device comprising:
   an airbag housing disposed at an outer surface of a vehicle;
   first and second guide housings disposed at the outer surface of the vehicle and respectively coupled to two opposite ends of the airbag housing;
   first and second deployment guides respectively housed at the first and second guide housings;
   an airbag cushion housed at the airbag housing and configured to deploy in a shape that covers the outer surface of the vehicle; and
   a plurality of guide rings including (1) a plurality of first guide rings coupled to a first side of the airbag cushion and (2) a plurality of second guide rings coupled to a second side of the airbag cushion opposite to the first side,
   wherein the first deployment guide extends through the plurality of first guide rings, and the second deployment guide extends through the plurality of second guide rings, and
   wherein the first and second deployment guides are configured to respectively move out from the first and second guide housings when the airbag cushion is deployed.

* * * * *